United States Patent

[11] 3,619,665

[72] Inventor Walter Frank Kosonocky
Skillman, N.J.
[21] Appl. No. 866,565
[22] Filed Oct. 15, 1969
[45] Patented Nov. 9, 1971
[73] Assignee R.C.A. Corporation

[54] OPTICALLY SETTABLE FLIP-FLOP
5 Claims, 4 Drawing Figs.

[52] U.S. Cl. .......... 307/279, 307/311, 307/251
[51] Int. Cl. .......... H03k 3/26
[50] Field of Search .......... 307/251, 304, 311, 279, 238, 291

[56] References Cited
UNITED STATES PATENTS

| | | | |
|---|---|---|---|
| 3,104,323 | 9/1963 | Over, Jr. et al. | 307/311 |
| 3,189,745 | 6/1965 | Van Reymersdal | 307/311 |
| 3,284,782 | 11/1966 | Burns | 307/251 |
| 3,463,928 | 8/1969 | Murphy | 307/311 |
| 3,514,765 | 5/1970 | Christensen | 307/251 |

*Primary Examiner*—Donald D. Forrer
*Assistant Examiner*—R. E. Hart
*Attorney*—H. Christoffersen

ABSTRACT: An electrically and optically settable flip-flop is disclosed which includes, in integrated circuit form, an MOS flip-flop memory cell including first and second cross-coupled transistors coupled through respective third and fourth load transistors to a source of potential. A photodiode is connected from the cross connection between the output of said first transistor and the input of said second transistor to the substrate, whereby the photodiode is charged substantially to the source potential when the flip-flop is in its reset state with the first transistor cut off and the second transistor conductive. Interruption of the coupling of potential to the first transistor isolates the photodiode. Light energy directed to the photodiode renders it conductive to reduce the voltage at the input of the second transistor until its output turns on the first transistor, whereby the flip-flop is set. Restoring the coupling of bias potential to the first transistor causes the existing electrical state of the flip-flop to be maintained.

INVENTOR.
Walter F. Kosonocky
BY
ATTORNEY

INVENTOR
Walter F. Kosonocky
BY
Carl V. Olson
ATTORNEY

OPTICALLY SETTABLE FLIP-FLOP

The invention herein described was made in the course of, or under contract or subcontract thereunder with the Department of the Air Force.

BACKGROUND OF THE INVENTION

In the field of data processing and information systems, bistable semiconductor circuits of flip-flops are often used in registers and in memory arrays to store a corresponding number of binary information bits. Such registers and memory arrays are electrically accessible for the writing of binary information thereinto, and for the reading out of binary information therefrom. There is an increasing interest in computer systems including components in which binary information is represented by optical or light signals, rather than electrical signals. It is then desirable to provide for the translation of light signals into corresponding electrical signals.

SUMMARY OF THE INVENTION

It is therefore an object of this invention to provide an improved semiconductor bistable circuit which is electrically accessible in the usual way, and which is also capable of being set to one or the other of its two stable states in response to the presence or absence of an input light signal. The circuit includes cross-coupled transistors and a photodiode connected to control the states of the transistors in response to an input light signal.

DESCRIPTION OF PREFERRED EMBODIMENTS

Figure 1:
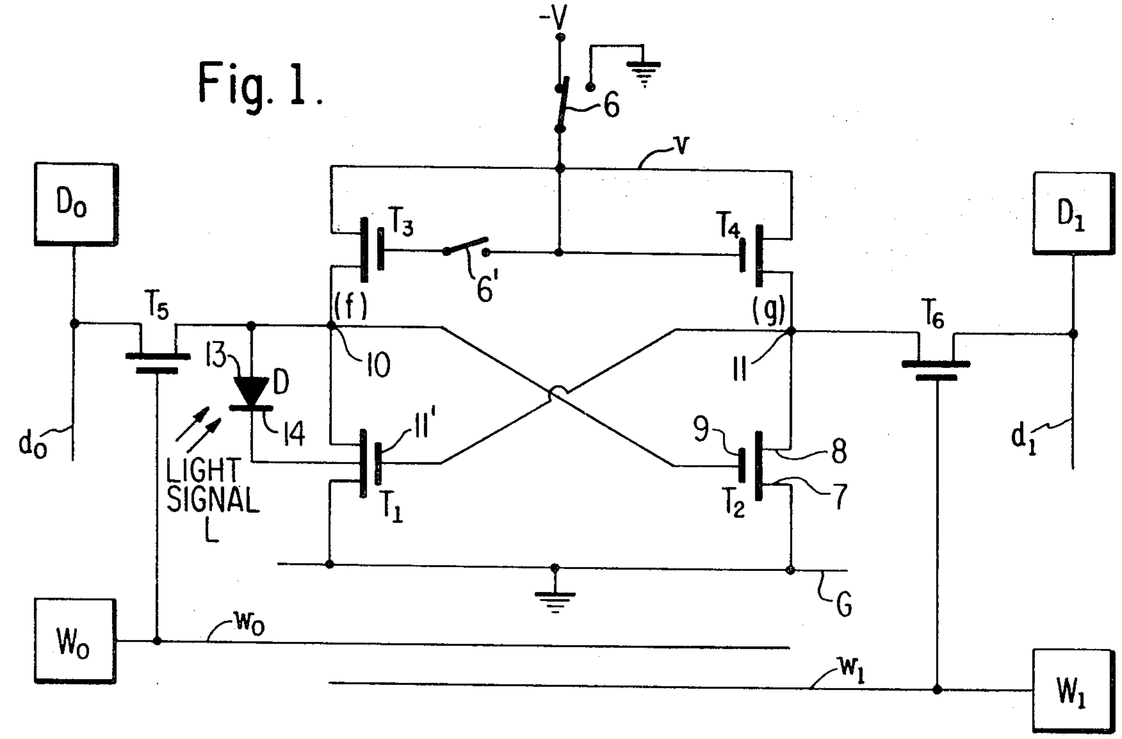
FIG. 1 is a circuit diagram of an electrically and optically settable flip-flop constructed according to the teachings of the invention.

Referring now in greater detail to FIG. 1, there is shown an electrically and optically settable bistable circuit or flip-flop. The flip-flop portion of the circuit includes cross-coupled transistors $T_1$ and $T_2$, and low impedance transistors $t_3$ and $T_4$ for transistors $T_1$ and $T_2$, respectively. The load impedance transistors $T_3$ and $T_1$ are connected through a switch 6 to the negative terminal $-V$ of a potential source having its other terminal connected to a reference or ground potential point in the circuit.

The transistors $T_1$ through $T_4$ are MOS (metal oxide semiconductor) field effect transistors. Each transistor includes, as shown in relation to transistor $T_2$, a source 7, a drain 8, and a gate electrode 9. The described circuit including transistors $T_1$ through $T_4$ constitutes a known bistable circuit or flip-flop.

The flip-flop is shown connected as one memory cell in an array of memory cells which includes means for electrically writing an information bit into the memory cell and reading out an information bit from the memory cell. The accessing means includes a digit drive and sense circuit $D_0$ connected to a digit column line $d_0$, and a digit driver and sense circuit $D_1$connected to a digit column line $d_1$. The accessing means also includes a word driver $W_0$ connected to a word row line $w_0$, and a word driver $W_1$ connected to a word row line $w_1$.

The digit line $d_0$ is coupled through a gate transistor $T_5$ to the drain or output 10 of transistor $T_1$ and to the gate electrode 9 of transistor $T_2$. The gate transistor $T_5$ is enabled by a signal applied to the gate electrode thereof from the word line $w_0$. The digit line $d_1$ is coupled through a gate transistor $T_6$ to the drain or output 11 of transistor $T_2$ and to the gate electrode of transistor $T_1$. Gate transistor $T_6$ is enabled by a signal from the word line $w_1$.

The circuit of FIG. 1 also includes a PN photodiode D having one side, an anode 13, connected to the drain or output 10 of transistor $T_1$, and through a cross connection to the gate 9 of transistor $T_2$. The diode D has another side or cathode 14 connected to a point of reference potential which is the bulk silicon substrate of transistor $T_1$. When the circuit is built in integrated form, the bulk silicon substrate may be common also to transistors $T_2$ through $T_6$.

Figure 4:
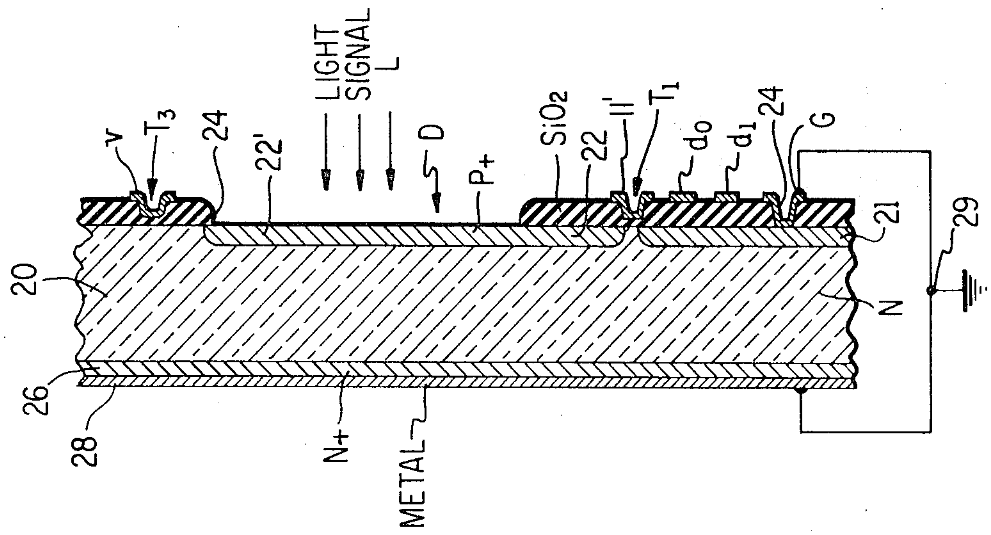
FIG. 4 is a sectional view taken along the line 4—4 in FIG. 3.
Figure 3:
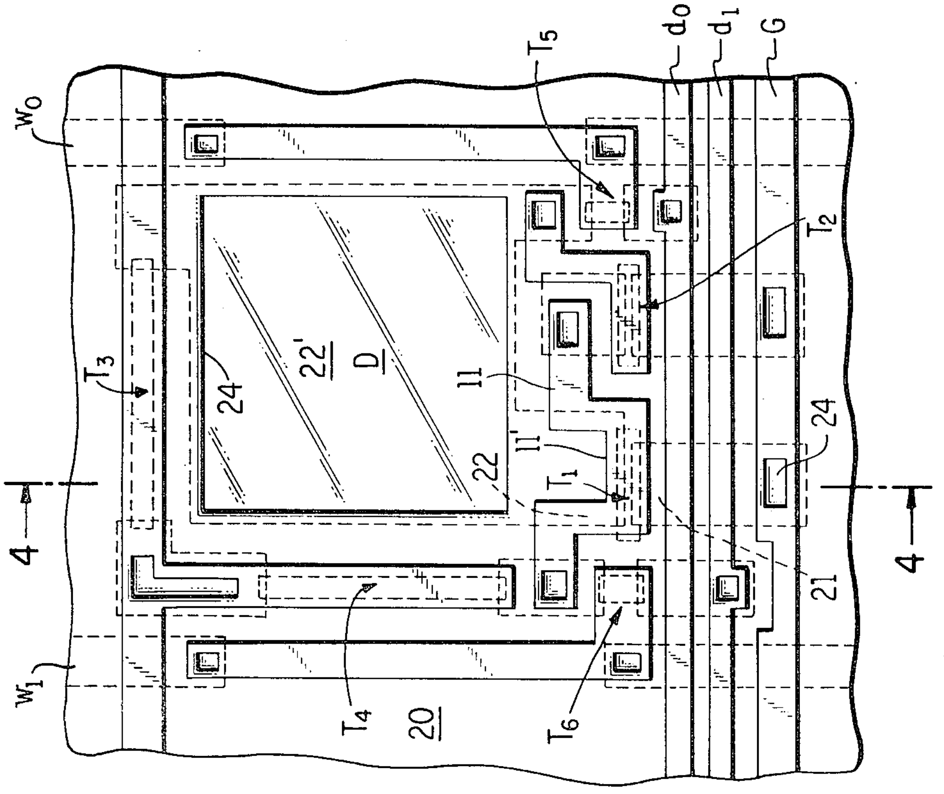
FIG. 3 is a plan view of an integrated circuit embodiment of the circuit of FIG. 1.

FIGS. 3 and 4 show a physical construction of the electrically and optically settable memory element shown in circuit diagram form in FIG. 1. The circuit is constructed on an N-type silicon substrate 20 in which regions of P+silicon are formed to serve as source and drain elements of the transistors. The P+ regions and the regions therebetween are covered with a layer of silicon dioxide $SiO_2$, to provide electrical insulation. Conductive gate electrodes are formed over the regions between respective sources and drains. Electrical conductors, formed on the silicon dioxide layer, include contact regions extending through openings in the silicon dioxide layer to the P+ regions below.

The transistors $T_1$ through $T_6$ shown in FIG. 1 are indicated in FIG. 3 by the same respective designations $T_1$ through $T_6$. The transistor $T_1$ is seen from FIGS. 3 and 4 to include a P+type source 21 separated from a P+type drain 22. A thin silicon dioxide layer overlying the area between the source 21 and the drain 22 forms an insulating region over which is positioned a conductive gate electrode 11'. The digit conductor lines $d_0$ and $d_1$ are shown on top of the silicon dioxide layer. A ground line G is shown on the silicon dioxide layer with a contact region 24 extending through the silicon dioxide layer to make electrical contact with the P+ material forming the source 21 of transistor $T_1$. The construction of load impedance transistor $T_3$ is also shown in both of FIGS, 3 and 4.

The drain 22 of transistor $T_1$ is shown in FIGS. 3 and 4 to be a P+ material which is extended along the N-type substrate 20 to a relatively large square are designated 22'. The P+ material in the area 22' forms an anode 13 in FIG. 1 of the photodiode D. The N-type material 20 forms the cathode 14 in FIG. 1 of the photodiode D. The large surface of the P+ material 22' is shown as visible through an opening 24 in the silicon dioxide layer. The material 22' shown in FIG. 4 is not covered with silicon dioxide. However, if desired for passivating purposes and more efficient light transmission, the are 22'may be covered with a thin layer of silicon dioxide having a thickness equal to about one-fourth the wavelength of the light signal L, so that reflections of the light signal at the surface of the silicon are minimized.

To complete the structural description, the bottom surface of the N-type silicon 20 may be provided with a thin N+ layer 26 on which is formed a metal ground layer 28. The metal ground layer 28 is externally connected by a wire 29 to the ground conductor G on the top surface of the integrated circuit. Since the construction of MOS integrated circuits is generally known, it is not necessary here to describe the construction shown in FIGS. 3 and 4 in greater detail.

OPERATION

Figure 2:
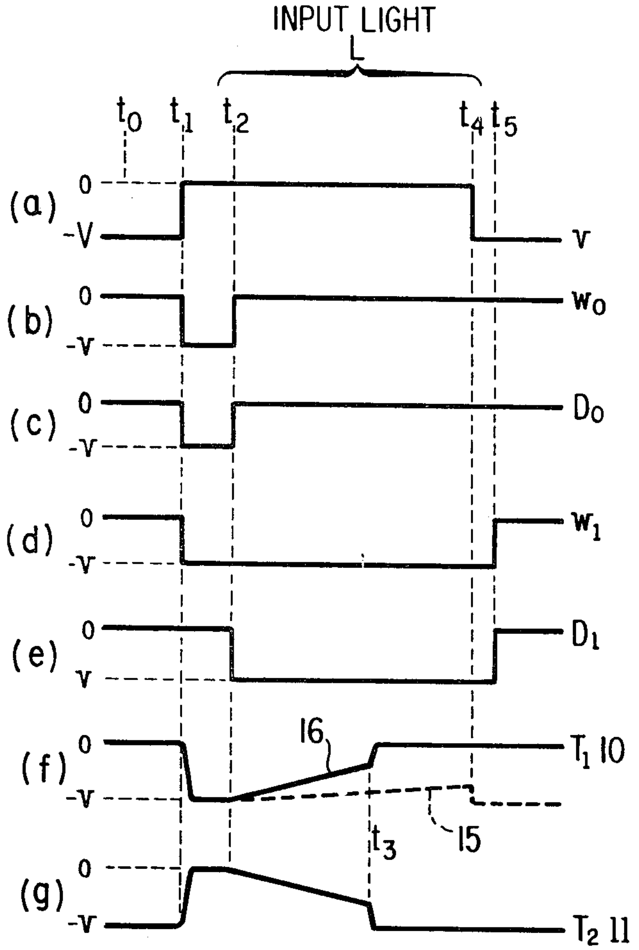
FIG. 2 is a chart of voltage waveforms which will be referred to in describing the operation of the circuit of FIG. 1.

The operation of the circuit of FIG. 1 will now be described with references to the waveforms of FIG. 2. The flip-flop is assumed at time $t_0$ to be in its set condition with transistor $T_1$ conducting and transistor $T_2$ cut off. Since the circuit is responsive to an input light signal only when the flip-flop is in its reset state, the flip-flop must be electrically reset as a matter of routine before an input light signal is applied. This is accomplished at time $t_1$ by applying a negative pulse, FIG. 2*c*, to the digit line $d_0$ concurrently with a negative pulse, FIG. 2*b*, to the word line $w_0$ to enable gate transistor $T_5$. The negative pulse passed by gate transistor $T_5$ is applied to output 10 of transistor $T_1$ and to the gate electrode 9 of transistor $T_2$. This makes transistor $T_2$ conductive, and, through regenerative action of the cross-coupled transistors, makes transistor $T_1$ nonconductive. The flip-flop is then in its reset state with $-v$ voltage at the output 10 of transistor $T_1$ and across the photodiode D. The speed of resetting is increased by simultaneously applying waveform 2*d* to the word line $w_1$ and waveform 2*e* to digit line $d_1$. The photodiode is now charged to the $-v$ voltage.

In order to make the circuit sensitive to light, it is necessary to isolate the diode D to prevent it being maintained in a charged state by current from any source. After time $t_2$, current is no longer supplied from digit line $d_0$ through gate transistor $T_5$, and the diode D can be isolated by using switch 6 to interrupt the $-V$ bias source, FIG. 2*a*, at a time prior to time $t_2$ when input light may be received. In order to permit the transistor $T_2$ to respond to a change in voltage on its gate electrode, a $-v$ voltage, FIG. 2*e*, is applied to digit line $d_1$ at time $t_2$ and passed through gate transistor $T_6$ (which is already enabled from word line $w_1$, FIG. 2*d*), to the output 11 of transistor $T_2$. This, in effect, substitutes gate transistor $T_6$ for transistor $T_4$ as a load for transistor $T_2$. According to an alternative mode of operation, switch 6 can be left in its closed position and switch 6' can be opened instead.

If no input light signal impinges on the diode D during the interval between $t_2$ and $t_4$, the charge on the diode is only slightly diminished by leakage as shown by the dashed line 15 in FIG. 2*f*. Then, at time $t_4$, when the $-V$ bias is restored, the flip-flop remains in its reset state.

On the other hand, if an input light signal impinges on diode D after time $t_2$, the diode is rendered conductive, and the charge across the diode is reduced as shown by the line 16 in FIG. 2*f*. This voltage is coupled to the gate electrode of transistor $T_2$, and the reduction in voltage reduces the conductivity of transistor $T_2$ until the threshold voltage of $T_1$ is reached at time $t_3$. Then, by regenerative action, transistor $T_1$ is rendered conductive and the flip-flop is in its set state. The set state of the flip-flop is maintained by restoring the $-V$ bias source at time $t_4$ prior to the removal at time $t_5$ of $-v$ voltage from digit line $d_1$, FIG. 2*e*, and from word line $w_1$, FIG. 2*d*.

While the invention has been described as being constructed using P-MOS filed effect transistor technology, it will be understood that it can also be constructed by those skilled in the art using N-channel MOS, or complementary MOS technology. Further, the foregoing constructions can be of the bulk silicon type or the silicon-on-sapphire type.

We claim:

1. An electrically and optically memory element, comprising a bistable MOS memory cell including first and second cross-coupled transistors coupled through respective third and fourth load impedances to a source of potential, said transistors each having a source, a drain and a gate, the drain of each transistor being cross-coupled to the gate of the other transistor, and a photodiode having one side connected to the drain of the said first transistor and to the gate of said second transistor and having the other side returned to a reference potential, said photodiode being thereby reverse biased and charged substantially to said potential when said first transistor is cut off and said second transistor is conductive, and a discharging of said photodiode causes said second transistor to be cut off and said first transistor to be conductive.

2. A memory element as defined in claim 1 wherein said transistors include a source and a drain of one conductivity type on a substrate of another conductivity type, and wherein the one side of said photodiode is constituted by an extension of the drain of said first transistor.

3. A memory element as defined in claim 1 and, in addition, means to interrupt the coupling of said potential to said first transistor and said photodiode, whereby light energy directed to said photodiode causes a setting of said memory cell.

4. A memory element as defined in claim 3, and in addition, means to restore the coupling of said potential to said first transistor and photodiode to maintain the existing electrical state of the memory cell.

5. A memory element as defined in claim 1, and in addition, means to interrupt the coupling of said potential to said first transistor and said photodiode, means to direct light energy to said photodiode to render it conductive to reduce the voltage coupled to the input of said second transistor until its output turns on said first transistor, and means to restore the coupling of bias potential to said first transistor and photodiode to maintain the existing electrical state of the flip-flop.

* * * * *

UNITED STATES PATENT OFFICE
CERTIFICATE OF CORRECTION

Patent No. 3,619,665 Dated November 9, 1971

Inventor(s) Walter Frank Kosonocky

It is certified that error appears in the above-identified patent and that said Letters Patent are hereby corrected as shown below:

Column 1, line 8, change "of" to ---or---, line 46, change "low" to ---load---, line 46, change "$t_3$" to ---$T_3$---, line 48, change "$T_1$" to ---$T_4$---.

Column 2, line 34, change "," to ---.---, line 37, change "are" to ---area---, line 38, change "an" to ---the---, line 45, change "are" to ---area---.

Column 3, line 6, change "it" to ---its---, line 38, change "filed" to ---field---.

Column 4, line 2, after "optically" insert ---settable---, line 10, delete "the" (second occurance).

Signed and sealed this 2nd day of May 1972.

(SEAL)
Attest:

EDWARD M.FLETCHER,JR.
Attesting Officer

ROBERT GOTTSCHALK
Commissioner of Patents